Nov. 12, 1940.   G. V. RYLSKY   2,221,152
ILLUMINATING MEANS FOR NAVIGATING INSTRUMENTS
Filed June 18, 1938
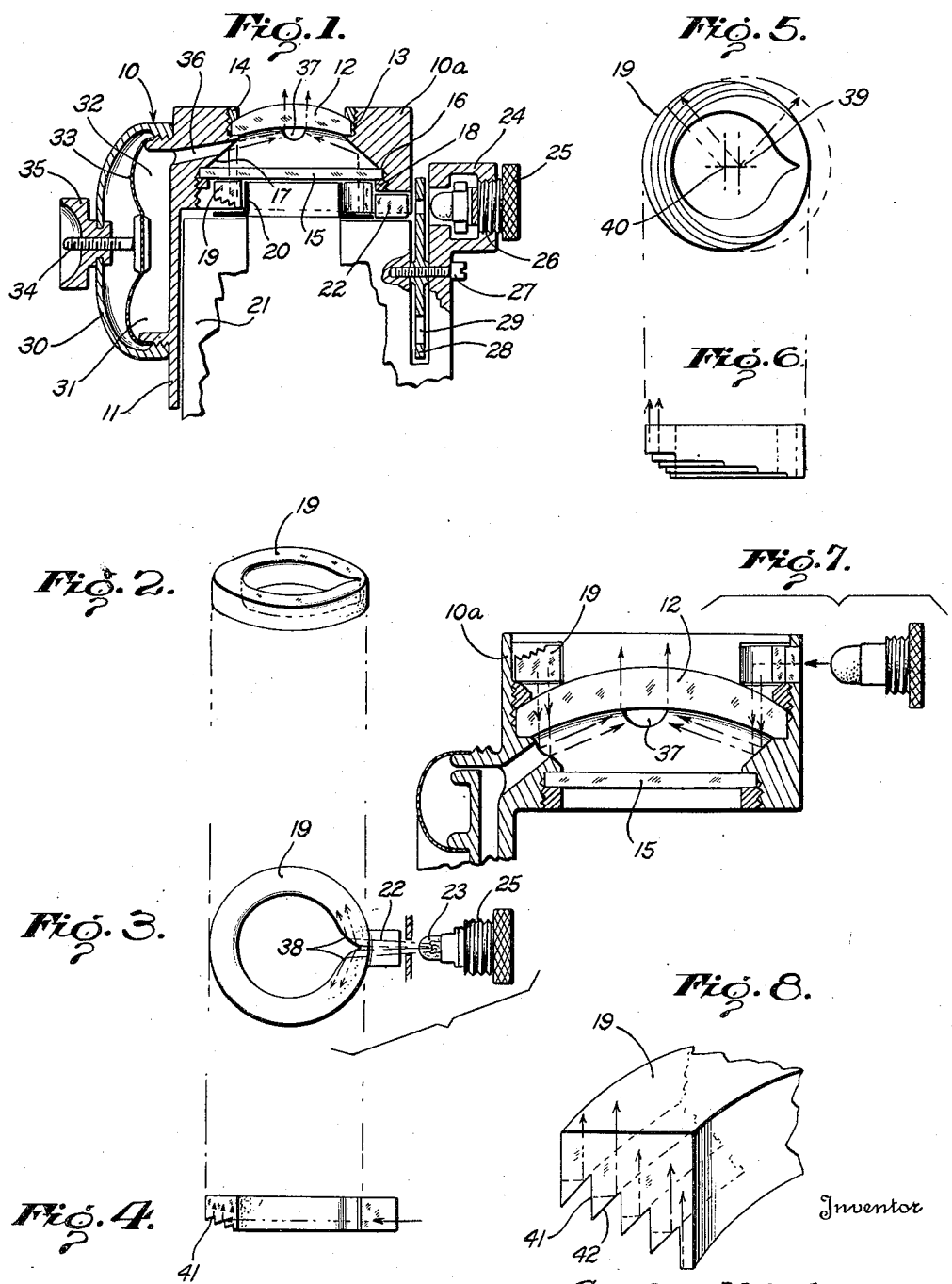
Inventor
Gregory V. Rylsky
By Stephen Cerstvik  Attorney Patented Nov. 12, 1940

2,221,152

UNITED STATES PATENT OFFICE 2,221,152

ILLUMINATING MEANS FOR NAVIGATING INSTRUMENTS

Gregory V. Rylsky, New York, N. Y., assignor to Bendix Aviation Corporation, South Bend, Ind., a corporation of Delaware Application June 18, 1938, Serial No. 214,563

11 Claims. (Cl. 240—6.44)

The present invention relates to liquid bubble levels, and more particularly to illuminating means for the bubble of a liquid bubble level, especially adapted for use in sighting devices such as sextants, octants, bomb-sights and the like.

The invention embodies novel means whereby uniform illumination of the bubble of a liquid level may be obtained.

More specifically, the device embodying the invention is provided for the purpose of providing an adjustable uniform illumination of a bubble chamber and simultaneously providing a sharp line of demarcation between the bubble and its background when viewed through a sighting device such as a sextant or octant, for example.

It has long been known in the art that a liquid bubble level may be employed as an artificial horizon in conjunction with instruments wherein it is desired to correlate the position of a body with respect to the horizon, as for example in navigating instruments such as sextants or octants.

Means have been provided heretofore for illuminating the bubble, but such means have comprised either a coating of luminous material of constant light intensity for uniformly illuminating the bubble or the use of a point source of light whereby the illumination of the bubble was decidedly non-uniform.

Combintions of both point source illumination and a coating of luminous material have also been utilized, but such combinations have failed to provide uniform illumination at the higher intensities.

In devices of the prior art, providing uniform illumination of the bubble by means of a layer of luminous material, such an arrangement has provided an illumination which was proper for one intensity of daylight but wholly unsuitable for other intensities thereof. Further, in utilizing such devices as sextants and octants, the observer may use the navigating instrument to sight on a highly luminous body such as the sun and also use the same instrument for sighting stars of greatly varying magnitudes.

These devices of the prior art have failed, therefore, to provide illuminating means for the bubble which would provide adjustable illumination, and also have failed to provide an adjustable illumination which would be uniform at each adjusted value thereof.

Accordingly, one of the objects of the present invention is to provide a novel illuminating means for a liquid level for use with sighting instruments, in which the foregoing difficulties are obviated.

Another object is to provide, in combination, a bubble chamber, novel illuminating means embodying a point source of light, means for distributing said light, and means for projecting said light against a reflector whereby the edges of the bubble are uniformly illuminated and light from the distributing means is prevented from escaping directly to the eye of the observer.

Still another object is to provide in combination, a bubble chamber, a point source of light, means for distributing said light uniformly, and means for projecting said light axially of said bubble chamber and against the sides of said chamber to, in turn, project said light against the edges of the bubble from the sides thereof only.

A further object is to provide novel illuminating means for a bubble chamber, comprising a point source of light, means for adjusting the intensity of said light source, means for uniformly distributing said light at all desired intensities, and means for projecting said light against the bubble at such an angle that the light from the distributing means is prevented from directly entering the eye of the observer.

The above and further objects and adavntages of the invention will appear more fully hereinafter from a consideration of the detailed description which follows, taken together with the accompanying drawing wherein are illustrated two embodiments of the invention. It is to be expressly understood, however, that the drawing is for the purpose of illustration and description only and is not designed as a definition of the limits of the invention, reference being primarily had for this purpose to the appended claims.

In the drawing wherein like reference charatcers refer to like parts throughout the several views;

Fig. 1 is a side elevation in section, illustrating one embodiment of the invention;

Fig. 2 is a view, in perspective, illustrating the light conducting and distributing means;

Fig. 3 is a plan view illustrating the cooperative relation between the point source of light and the light conducting and distributing means;

Fig. 4 is a side view of the light conducting and distributing means illustrating the manner of reflection of the light rays from the interior of said member;

Fig. 5 is a plan view of the light conducting and distributing member illustrating the distribution of the light reflecting means on said member;

Fig. 6 is a side view of the structure illustrated in Fig. 5;

Fig. 7 is a side view, in section, of another embodiment of the invention; and

Fig. 8 is a detailed view of a portion of the light conducting and distributing member illustrating the path of the light rays and the manner of reflection thereof from the interior to the exterior of said member.

Referring to the drawing and more particularly to Fig. 1, the instrument embodying the present invention is shown in the form of a bubble chamber which may be used in a sextant, octant or any device utilizing a bubble chamber, and comprises a body 10 composed of a solid ring of metal 10a and a projecting portion 11. A lens 12 is mounted on a shoulder 13 of the ring 10a and is held in place therein by a threaded ring 14. A space between the periphery of the lens and the metal ring may be sealed by cement to provide a leak-tight connection. A glass plate 15 of greater diameter than the lens 12 provides a window closing the lower part of the bubble chamber, and the window is held against a shoulder 16 formed by the bottom of the conical sides 17 on the interior of ring 10a by means of threaded ring 18. The window may also be sealed with cement to provide a leak-tight connection.

A light conducting and distributing ring element 19 composed of light conducting material such as glass, quartz or "Lucite" is located beneath the window 15 near the outer edge thereof and directly below the conical sides 17 of the ring 10a and, therefore, directly within the projected area of said sides. Light shielding means 20 support the ring 19 in operative position, and said shield and ring are maintained in operative position by the body 21 abutting shielding means 20 and fastened to the ring 10a by any suitable means (not shown).

A light conducting member 22 is located adjacent to ring 19 and serves to retain the light rays in undispersed condition as they are received from the point light source.

A minature electric lamp 23 provided with suitable electrical contacts (not shown) is mounted in an extension 24 of body 21 by means of screw threads 25 cooperating with threads 26 in extension 24.

Rotatably mounted by means of adjustable screw 27 in the path of the light rays between the lamp 23 and the light conducting member 22 is a rotatable disc 28 provided with a series of apertures 29 which apertures are uniformly graduated in size and distributed around the circumference of disc 28. An internally threaded housing member 30 cooperating with a threaded rim 31 formed on the body 10 provides a chamber 32 within which is mounted a diaphragm 33 carrying a threaded element 34 whereby the diaphragm may be adjustably moved toward and away from the body 10 by means of knob 35 mounted for rotation in housing 30. A channel 36 provides a communicating passage between the chamber 32 and the bubble chamber proper formed by the lens 12, conical sides 17 of ring 10a and the window 15.

That part of the chamber 32 on the right hand side of diaphragm 33 and the bubble chamber is filled with a liquid (not shown) and by variation of the position of the diaphragm 33, the size of bubble 37 may be adjusted in a manner well known in the art.

The structure of the light conducting and light distributing ring element 19 is shown in Figs. 2 to 6 inclusive, and the detailed construction of the light reflecting grooves is illustrated in Fig. 8. Referring to these figures, element 19 is shown in the form of a ring in order to conform to the interior construction of the body 10 but it is to be expressly understood that said element 19 may have any shape cooperating with the particular shape of the bubble chamber. A polished reflecting surface 38, as shown in Fig. 3, serves as a light reflecting means whereby the light rays received from lamp 23 by means of light conducting member 22 are uniformly reflected, to be conducted in equal amounts between the two halves of ring element 19.

As shown in Figs. 5 and 6, a series of grooves is cut into the ring element 19, the center 39 of the groove circle being located to the right of the center 40 of the ring element itself. The radius of the outer groove is therefore greater than the outer radius of the ring so that by cutting a series of grooves of gradually decreasing radii these grooves will be so distributed over a surface of the ring, such as the bottom thereof, and in such a pattern that a greater reflecting surface is provided remotely from the point of entry of the light rays than is provided adjacent the point of entry thereof so that light will be emitted from the interior of the ring 19 outwardly therefrom uniformly at all distances from the light source.

As shown in more detail in Figs. 4 and 8, the grooves comprise a series of annular triangularly shaped grooves having surfaces 41 and 42, these grooves extending along the bottom of the light conducting member whereby a series of reflecting surfaces are provided by polishing the surfaces 42 of the grooves. Light enters the ring as shown in Fig. 3 by means of light conducting member 22 and is distributed by polished reflectors 38 to both sides of the ring. Some light will be emitted upwardly from the ring at the point of entrance of light thereto and since the light intensity is greatest at this point, no artificial means other than the ordinary irregularities in the material of the light conducting member are needed in order to reflect the light out of the ring shaped member 19 at this point. As the light travels around the ring, the tiny irregularities on the side walls thereof will reflect the light towards the interior. The unpolished surfaces 41 will diffuse the light rays in the greatest part toward the center of the ring but these rays will meet the conical polished surfaces 42 which will reflect the light upwardly.

The diffusion of the light in the upward direction will also occur, even though at less efficiency, if all the surfaces of the grooves are unpolished. In this case, the grooves increase the light diffusing surface and distribute the light throughout the ring to thereby produce uniform illumination.

Figs. 4 and 8 are not intended to exhaustively illustrate the path of the light rays but merely indicate in a general manner how the light rays are reflected so as to emerge from the light rays in the direction of the axis of the bubble chamber in order to impinge upon the conical interior surface thereof.

The operation of the device is as follows: The disc 28 with its series of different sized openings 29 is adjusted until a desired intensity of illumination is obtained from lamp 23. The light rays from lamp 23 enter the light conducting member 22 which serves as a means of preventing the diffusion of said light rays which are conducted to the ring 19 to impinge upon the polished surfaces 38, whereby the rays are reflected uniformly about the two halves of the ring. Light is emitted upwardly from the ring, as is seen in Fig. 1, and the light so emitted forms a hollow cylinder of light rays which rays are uniformly distributed throughout the circumference of said cylinder. This hollow cylinder of light rises axially of the bubble chamber as seen in Fig. 1 and circumscribes the path of the light which is received from the objects being observed, which latter light enters the opening of ring 19 and proceeds toward the eye of the observer located above lens 12.

It is seen, therefore, that the light reflected from the ring 19 is kept entirely separate from the light received from the object observed, and a hollow cylinder of light for illuminating the bubble is reflected from the conical sides 17 of ring 10a directly to the edges of the bubble 37 and at such an angle that none of this reflected light can impinge directly upon the eye of the observer. Since the light is emitted uniformly from all parts of ring 19, the light reflected by the conical sides 17 uniformly illuminates the complete periphery of the bubble so that it appears as a luminous ring upon a dark background provided by the liquid in the bubble chamber and presents an appearance such as shown in Fig. 4 of the U. S. patent to Carbonara, No. 1,970,543. Without the use of the light distributing means in cooperation with the point source, the use of a point source of light would project light upon only one side of the bubble which would then appear in the field of view of the observer as an illuminated crescent instead of as an illuminating ring. By the use of applicant's novel illuminating means the bubble will appear to the eye of the observer as a uniform ring of light, clearly and sharply presented, regardless of the degree of magnitude of the star that is being observed, because the light received from the star is not at any time commingled with the light illuminating the bubble except for that small quantity received by the eye of the observer from the edge of the bubble itself to form the image thereof.

By adjustment of the disc 28, the amount of light desired for any particular object sighted and for any particular condition of illumination either of day or night, may be varied so that a uniform and adjustable illumination of the bubble depending upon the extraneous light conditions can always be obtained.

In Fig. 7 is illustrated another embodiment of the invention, wherein the light is injected into the bubble chamber from the top thereof. This particular embodiment may be desired under certain conditions of construction of the bubble chamber, the device illustrated in Fig. 7 being otherwise constructed in the same manner as that illustrated in Fig. 1.

Novel means are thus provided whereby an adjustable uniform illumination of the bubble may be obtained, and the light utilized for the illumination of the bubble is prevented from striking the eye of the observer except after final reflection from the bubble itself.

Although two embodiments of the invention have been illustrated and described, other changes and modifications in form, material and relative arrangement of parts, which will now appear to those skilled in the art, may be made without departing from the scope of the invention. Reference is therefore to be had to the appended claims for a definition of the limits of the invention.

What is claimed is:

1. In combination with a bubble chamber having substantially conical sides, means for illuminating the bubble in said chamber, comprising a point source of light, means for adjusting the intensity of said light, means comprising a light conducting ring for uniformly distributing said light at all desired intensities thereof, said ring being provided with grooved surfaces for projecting said light to said conical sides whereby said light is reflected therefrom against the bubble at such an angle that the light from said distributing means is prevented from entering the eye of an observer located in position to observe said bubble.

2. In a device of the character described, a metal ring having slanting sides on the interior thereof, a lens sealing one side of said ring, a light conducting plate sealing the other side thereof to thereby form a chamber together with said lens, said ring and said plate, means for conducting a liquid to said chamber, a liquid in said chamber, a bubble floating in said liquid, light conducting and distributing means located beneath said plate, a source of light leading to said light distributing means, and means cooperating with said light conducting means to emit the light therefrom upwardly against said slanting sides whereby light is uniformly directed towards the complete periphery of said bubble from the sides of said chamber, to uniformly illuminate said bubble throughout its periphery without light emerging through said lens directly from said light distributing means.

3. In a device of the character described, a bubble chamber, the sides of said chamber slanting upwardly from the bottom thereof, means forming a bubble in said chamber, a light conducting member extending completely about the periphery of said slanting walls and spaced therefrom, means providing a point source of light whereby light rays are supplied to said light conducting member, and means provided on the surface of said light conducting member, whereby light is reflected outwardly from the top of said member and against the slanting walls to be, in turn, reflected against the sides of said bubble completely about the periphery thereof.

4. A closed bubble chamber having light reflecting walls, means forming a bubble in said chamber, light distributing means located in a position spaced from said walls, a point source of light providing light flux for said light distributing means, and grooved surfaces on said light distributing member reflecting the light out of said member against said walls, said walls and said bubble being so located with respect to each other that the light reflected from said walls impinges on the periphery of said bubble from the sides only thereof.

5. A closed bubble chamber, comprising conical walls, a ring of light conducting material disposed adjacent the base of said walls outside of said chamber and in light conducting relation thereto, a point source of light supplying light flux to said ring, and means including a series of grooved portions on said ring for reflecting the light from the interior thereof outwardly therefrom and into contact with said conical walls.

6. In a device of the character described, a ring of metal having an inclined surface on the inside thereof, light conducting means closing the two open sides of said ring and provided therewith a bubble chamber, a ring of light conducting material located within the projected area of said inclined surface, a miniature lamp located in light conducting relation to said ring, means on said ring for reflecting uniformly into both halves of said ring, the light received from said lamp, and means comprising a series of circular grooves cut into the face of said ring, whereby the light received from said lamp is reflected outwardly therefrom and uniformly throughout the extent of said light conducting ring and upon the inclined surface of said metal ring.

7. In a device of the character described, a bubble chamber, said chamber being sealed and provided with light reflecting walls, a ring of light conducting material located outside of said chamber and adjacent one of said sealed sides, a point source of light for supplying light flux to said ring, said ring being provided with grooved portions for directing the light against the light reflecting walls of said chamber for illuminating said bubble by the light reflected from said light reflecting walls, and a rotatable disc interposed between said light conducting ring and said light source, said disc having a series of different sized openings distributed about the circumference thereof.

8. A bubble chamber comprising a metal ring, a shoulder near the top of said ring, a lens abutting said shoulder and sealing the top of said ring, a threaded ring cooperating with said first ring to hold said lens in operative position, a second shoulder adjacent the bottom of said first ring, a plate of light conducting material abutting said second shoulder and sealing the bottom of said first ring to form a chamber, a threaded locking ring cooperating with said first ring to hold said plate in position, an annular light conducting member located adjacent one of said sealing means and coaxially with said rings, a point source of light for providing light flux to the interior of said annular member and means on said annular light conducting member for reflecting the light from the interior thereof, whereby a hollow cylinder of light is reflected to the interior of said chamber.

9. In a device of the class described, a bubble chamber having slanting side walls in the interior thereof, means forming a bubble in said chamber, a light conducting member extending around the periphery of said slanting walls and spaced therefrom, means providing a point source of light whereby light rays are supplied to said light conducting member, and means provided on the surface of said light conducting member, whereby light is reflected out of said member and against the slanting walls to be, in turn, reflected against the sides of said bubble about the periphery thereof.

10. In a device of the class described, a bubble chamber having slanting side walls in the interior thereof, means forming a bubble in said chamber, a light conducting member extending around the periphery of said slanting walls and spaced therefrom, means providing a point source of light whereby light rays are supplied to said light conducting member, means provided on the surface of said light conducting member whereby light is reflected out of said member and against the slanting walls to be, in turn, reflected against the sides of said bubble about the periphery thereof, and a disc having a plurality of apertures of different sizes near its periphery and interposed between the light source and light conducting member so that light from said source passes through one of said apertures.

11. In a device of the class described, a bubble chamber having slanting side walls in the interior thereof, means forming a bubble in said chamber, a light conducting member extending around the periphery of said slanting walls and spaced therefrom, means providing a point source of light whereby light rays are supplied to said light conducting member, means provided on the surface of said light conducting member whereby light is reflected out of said member and against the slanting walls to be, in turn, reflected against the sides of said bubble about the periphery thereof, a disc having a plurality of apertures of different sizes near its periphery and interposed between the light source and light conducting member so that light from said source passes through one of said apertures, and means for adjustably rotating said disc to bring a desired one of said apertures into the path of the light from said light source, whereby a desired amount of light may be introduced into said light conducting member.

GREGORY V. RYLSKY.